Patented July 2, 1929.

1,719,350

UNITED STATES PATENT OFFICE.

ROBERT E. WILSON, OF CAMBRIDGE, MASSACHUSETTS, ASSIGNOR TO STANDARD OIL COMPANY, OF WHITING, INDIANA, A CORPORATION OF INDIANA.

PROCESS OF SEPARATING WAX FROM MINERAL OILS.

No Drawing.   Application filed July 18, 1922.   Serial No. 575,854.

This invention relates to a method of separating wax from mineral oils, and has more specific application to a method of removing the amorphous and other paraffin wax from the heavy petroleum residues or cylinder stocks for the production of lubricating oils.

It is an object of this invention to accomplish this removal by precipitating the wax from the oil by means of a suitable liquid and carrying out the process in a highly efficient manner and in a much shorter time than in prior processes.

According to this invention, many of the objectionable features incident to the prior processes have been overcome. A clean and rapid separation of the wax is accomplished by this new process and at a minimum of expense.

In carrying out this new process, the mineral oil which is to be separated from the wax is reduced to a suitably low viscosity by thinning with a suitable organic liquid, such as petroleum naphtha. If the original oil possesses a sufficiently low viscosity, the dilution or thinning with naphtha may, under certain conditions, be dispensed with.

Both the oil and wax go into solution in the naphtha, and it is an important object of this invention to precipitate this wax from the naphtha-oil composition. It is necessary that the precipitating agent be miscible with naphtha and throw out the wax almost completely, under proper conditions.

The alcohols, more particularly those of the paraffin series, have been investigated, and it was found that the members of this series are available for effecting this precipitation. Methyl and ethyl alcohols, when used alone, are not suitable for this process, because of their substantial non-miscibility with naphtha under practical operating conditions. The propyl alcohols, both normal and isopropyl, were found to be most suitable for this process. The higher alcohols, such as butyl and amyl, do not appear to be as desirable as the propyl alcohols, because larger quantities of these higher alcohols are necessary for causing the precipitation, thus increasing the cost of the process. Methyl and especially ethyl alcohols, however, may be used if they are perfectly dry and there is also added an agent, such as ethyl acetate or ethyl ether, which promotes the miscibility of these lower alcohols with the naphtha and oil mixture.

A specific example of carrying out this process is as follows: The oil which is to be dewaxed, is diluted with a suitable quantity of naphtha, the amount of naphtha employed varying up to 5 parts of naphtha to 1 part of oil, depending upon the character of the oil treated and its viscosity. To this diluted oil there is added the quantity of isopropyl alcohol necessary for the precipitation. This quantity also varies with the character of the oil and the degree of dilution of the oil and naphtha mixture. For ordinary purposes about 15–35% of isopropyl alcohol is used. The isopropyl alcohol is most effective when substantially pure, and should contain not over 2–4% of water. The precipitation of the wax is allowed to take place at temperatures ranging from 5–20° C. A good separation of the wax may be accomplished in about 10–20 hours at ordinary room temperature, and more rapidly at lower temperatures.

If it is desired to further accelerate the precipitation, other expedients used in prior processes, such as refrigeration, filter-pressing and centrifuging, may be employed as auxiliary to this process.

After the precipitation has been performed, the liquid is removed from the wax, by decantation or other suitable methods, and any adherent solvent may be removed from the wax by evaporation. The liquid is then heated in a still to remove the solvent from the oil. The two constituents of the solvent may be fairly well separated by the same distillation process if naphtha of the proper boiling point range is selected, and a suitable dephlegmating tower is used to fractionate the vapors issuing from the still. The alcohol may also be removed from the naphtha by shaking out with water, followed by fractionation of the alcohol-water mixture.

The present invention is not limited to the specific details set forth in the foregoing examples, which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In a process of separating wax naturally occurring in mineral oils from said oils, treating a low-viscosity oil containing said substances with an oil-miscible liquid which precipitates the bulk of the wax at a low temperature, said liquid consisting essentially of an alcohol of the aliphatic series and an agent which promotes the miscibility of said alcohol with the oil.

2. In a process of separating wax from mineral oils, treating a low-viscosity oil containing said substances with an oil-miscible liquid which precipitates the bulk of the wax, and consists essentially of a propyl alcohol.

3. In a process of separating wax from mineral oils, treating a low-viscosity oil containing said substances with an oil-miscible liquid which precipitates the bulk of the wax and consisting essentially of isopropyl alcohol.

4. In a process of removing wax which naturally occurs in lubricating oils from said oils, treating a wax containing oil thinned with naphtha with a liquid consisting essentially of an alcohol of the aliphatic series, which precipitates the bulk of the wax at a low temperature and is miscible with the other constituents of said composition.

5. In a process of precipitating wax from lubricating oils, the step of adding a propyl alcohol to a wax containing oil thinned with naphtha.

6. In a process of precipitating wax from lubricating oils, the step of adding isopropyl alcohol to a wax containing oil thinned with naphtha.

7. The method of separating wax naturally occurring in mineral oils from said oils at low temperatures by difference of specific gravity, which consists in adding to said oil aliphatic alcohols containing not more than 7 carbon atoms, adapted to mix with the oil and assist in the precipitation of the wax.

8. The method of separating wax from hydrocarbon oils at low temperatures by difference of specific gravity, which consists in adding to the oil aliphatic alcohols, containing between 3 and 7 carbon atoms.

ROBERT E. WILSON.